July 3, 1934.  J. R. RICHER  1,965,002
APPARATUS AND METHOD OF PRODUCING GEAR MEMBERS
Filed June 26, 1933   7 Sheets-Sheet 1

INVENTOR:
JOSEPH R. RICHER
BY Cox & Moore
ATT'YS

July 3, 1934.  J. R. RICHER  1,965,002
APPARATUS AND METHOD OF PRODUCING GEAR MEMBERS
Filed June 26, 1933   7 Sheets-Sheet 4

INVENTOR:
JOSEPH R. RICHER
BY Cox & Moore
ATT'YS

July 3, 1934.    J. R. RICHER    1,965,002
APPARATUS AND METHOD OF PRODUCING GEAR MEMBERS
Filed June 26, 1933    7 Sheets-Sheet 5
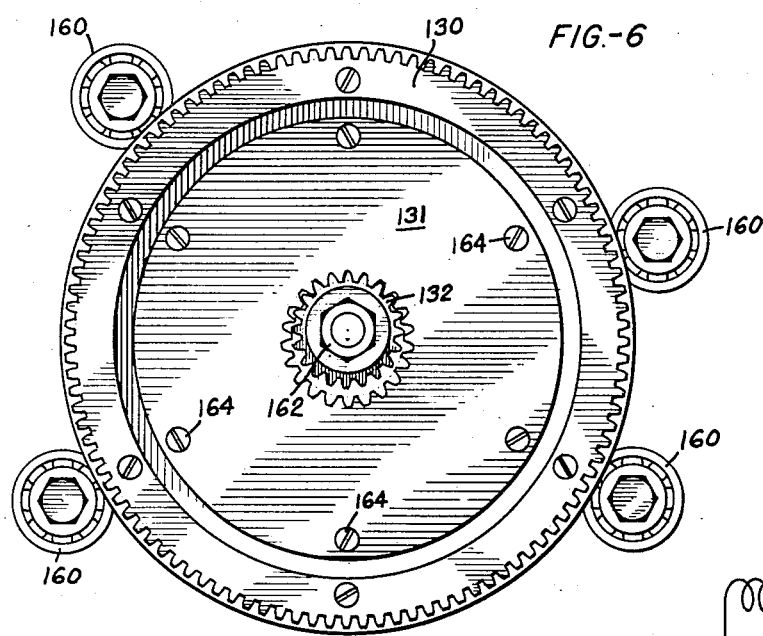
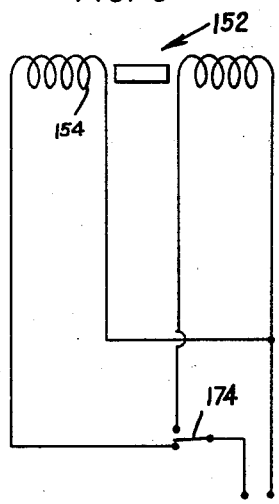
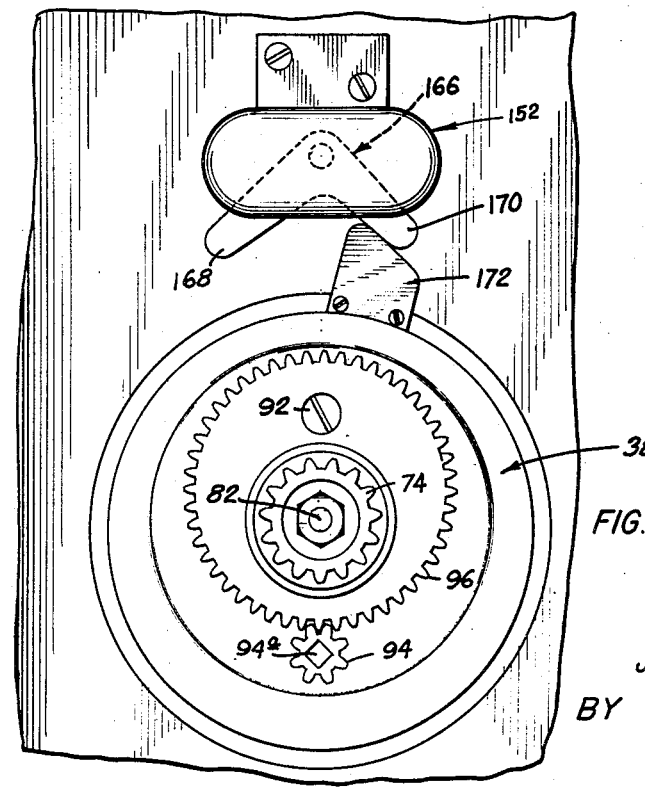
INVENTOR:
JOSEPH R. RICHER
BY
ATT'YS

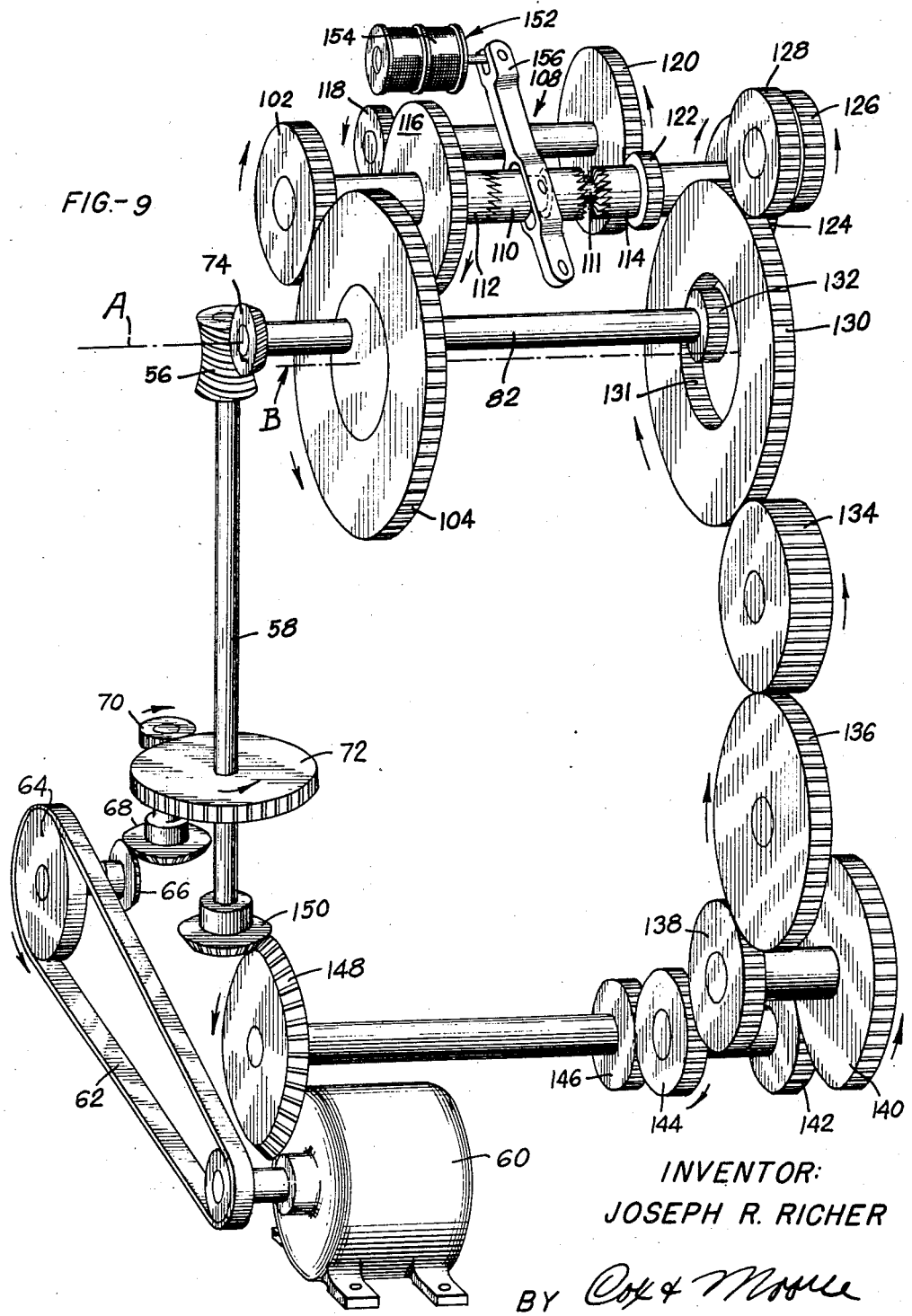

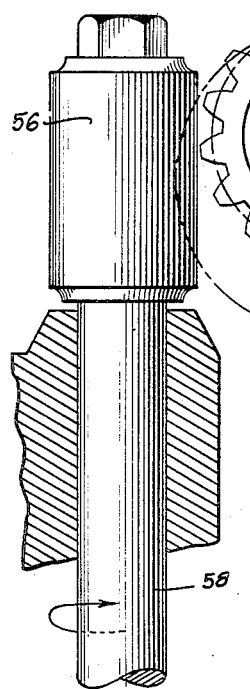
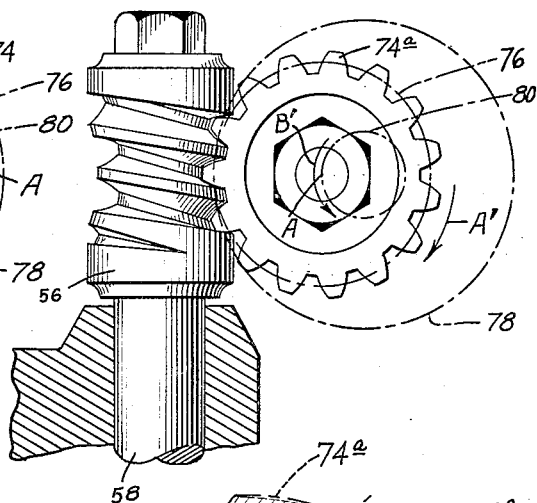
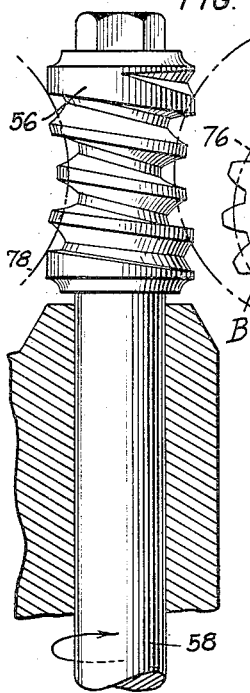
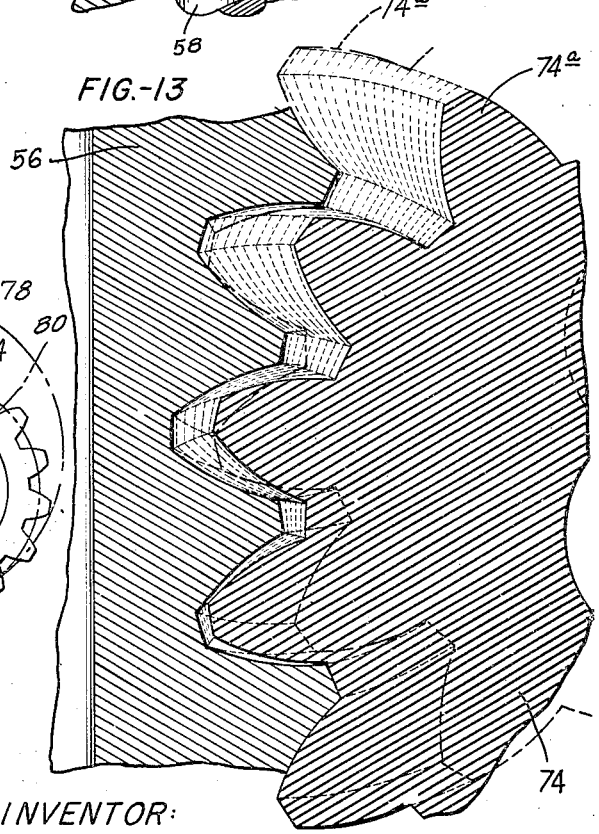

Patented July 3, 1934

1,965,002

UNITED STATES PATENT OFFICE 1,965,002

APPARATUS AND METHOD OF PRODUCING GEAR MEMBERS

Joseph R. Richer, Chicago, Ill., assignor to Illinois Tool Works, Chicago, Ill., a corporation of Illinois Application June 26, 1933, Serial No. 677,619

1 Claim. (Cl. 90—4)

My invention relates generally to apparatus for and methods of generating worms, and more particularly to apparatus and methods for producing hour-glass worms in accordance with the molding generating principle.

The molding generating principle or method of making gears has been practiced heretofore by the use of conventional hobbing machines. In accordance with that method, teeth are cut or formed in a gear blank, the blank and hob being rotated so as to, in effect, cause the gear, which is produced, to roll along the pitch line of the hob.

It is an object of the present invention to provide apparatus and methods whereby a worm, such as an hour-glass worm, may be produced by a gearlike cutter, which cutter, when acting upon the work blank, in effect, rolls along the pitch line of the worm, thereby forming the thread in the worm in accordance with the molding generating principle.

More specifically, my invention contemplates the provision of apparatus and methods, as above set forth, wherein a gearlike cutter may be employed having a pitch diameter which is less than the diameter of the pitch line curvature of the worm without deviating from the molding generating principle.

Another object of my invention is to provide an apparatus including a gear type cutter which is so arranged as to generate a worm thread, whose longitudinal cross sectional profile corresponds substantially with the profile of teeth in an imaginary internal gear of the same pitch but of larger pitch diameter than the cutter, said cutter being driven by means which rolls the pitch circle of the cutter upon the pitch circle of said internal gear, the latter pitch circle coinciding with the pitch line of the worm.

A further object is to provide an apparatus, as above set forth, in which an internal gear having a pitch circle, which is of the same curvature as the curvature of the pitch line of the worm, is operatively associated with the gear type cutter.

A still further object of my invention is to provide a novel and practical method, and means for practicing said method, including actuating means for operating a generating cutter in positive timed relation with the rotation and lead of the worm to be cut with respect to the rotation of the cutter about its own axis, and also with respect to the convolute travel of the cutter in an orbit about an axis which is eccentric to its own axis, whereby to produce the thread on a worm in accordance with the molding generating principle.

Still another object of my invention is to provide apparatus and methods for generating threads in an hour glass worm more rapidly than has been heretofore possible, and at the same time obtain a smoother finish on the work with a higher degree of accuracy in the worms produced.

More specifically, my invention contemplates the provision of means whereby the relative movement between the cutter and the work, during the cutting operation, takes place at a relatively slow feeding rate, and, during the idle relative movement between said parts, this rate of movement is materially increased, whereby to reduce to a minimum the time required to bring said parts into operative association with each other subsequent to the completion of a cutting stroke.

The foregoing and numerous other objects and advantages will be more apparent from the following detailed description when considered in connection with the accompanying drawings, wherein—

Figure 1 discloses a front elevational view of a machine which is representative of one embodiment of my invention, and by means of which my improved method of forming hour-glass worms may be practiced;

Figure 6 is a fragmentary elevational view of the internal driving gear and associated elements, as seen from the right of Figure 4 and as indicated by the section line 6—6 of that figure;

Figure 7 is a fragmentary elevational view taken from the left of Figure 4 substantially along the line 7—7 thereof;

Figure 8 is a circuit diagram for illustrating the manner in which the clutch control mechanism functions to change the speed of travel of the cutter during its cycle of movement;

Figure 9 is a semi-diagrammatic view of the essential elements of the machine shown in Figures 1 to 3, inclusive, for the purpose of more clearly illustrating the manner in which the worm and cutter are moved to effect the formation of the worm thread in accordance with the molding generating principle;

Figures 10 to 12, inclusive, disclose the manner in which the thread cutter progresses along a circular orbit and rotates about its own axis to form the thread in the worm, Figure 10 disclosing the cutter just prior to its engagement with the worm blank, Figure 11 disclosing the cutter during its operative association with the blank, and Figure 12 disclosing the cutter after it has completed its cutting operation and is being moved at increased speed through the idle portion of its cycle of operation; and Figure 13 diagrammatically illustrates the manner in which the molding generating principle is accomplished by the practice of my invention.

Figure 2:
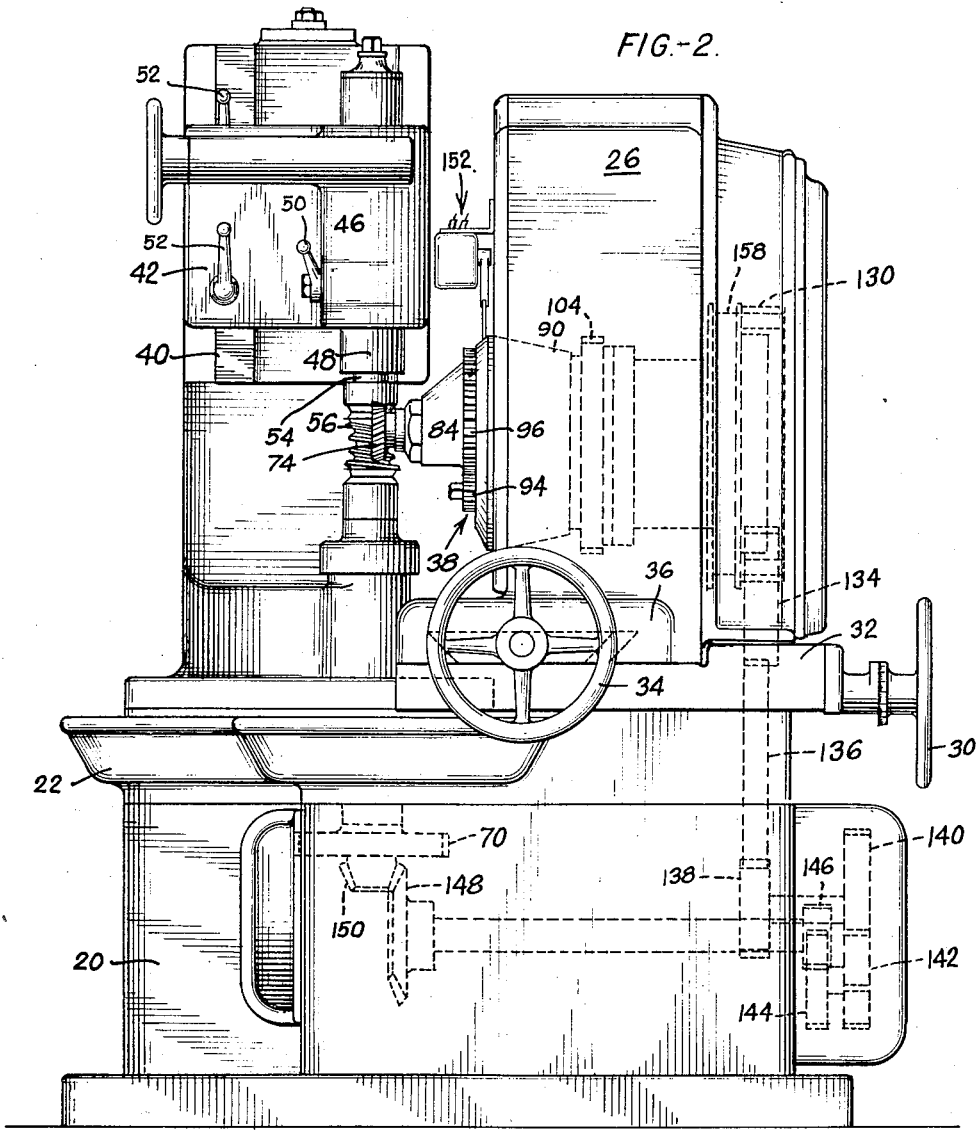
Figure 2 is a side elevational view of the machine as seen from the right of Figure 1.
Figure 3:
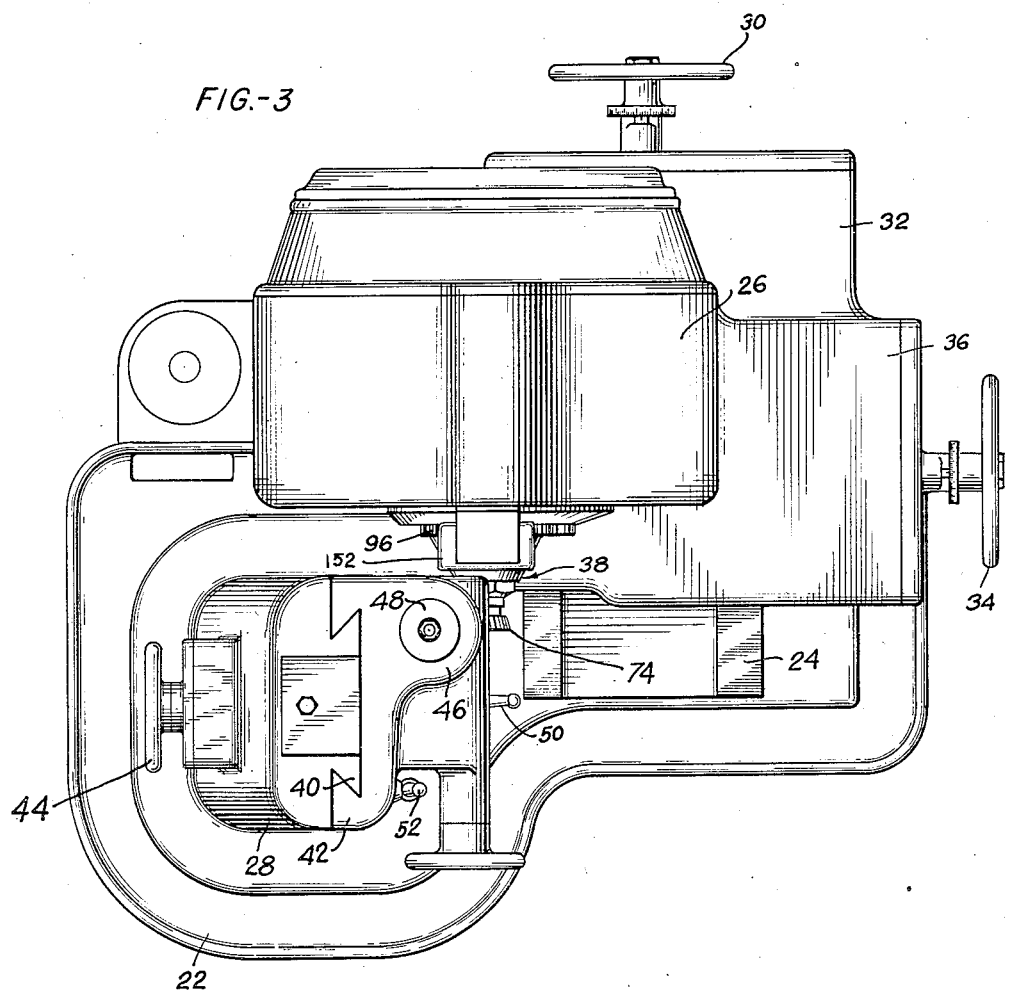
Figure 3 is a plan view of the machine disclosed in Figures 1 and 2.

Referring now to the drawings more in detail wherein like numerals have been employed to designate similar parts throughout the various figures, it will be seen that one embodiment of my invention constitutes a machine which includes a suitable base or bed 20. Mounted on the base 20 is a bed plate 22, which is provided at one side with a guide 24 for slidably receiving and guiding an upright spindle supporting head 26. The other side of the bed plate 22 supports an upright frame 28, which is secured in any suitable manner in a fixed position to said plate. Movement of the head 26 longitudinally of the guide 24 is accomplished through the agency of a suitable hand wheel 30, Figures 2 and 3, which cooperates to shift a slide 32 along the guide 24. The head 26 is adapted to be shifted transversely of the guide 24 by manual manipulation of a hand wheel 34, which cooperates with a slide 36 upon which the head 26 is directly mounted. The head 26 supports a spindle mechanism designated generally by the numeral 38, hereinafter to be described in detail, the details of said spindle mechanism being shown in Figures 4 to 7, inclusive.

Figure 1:
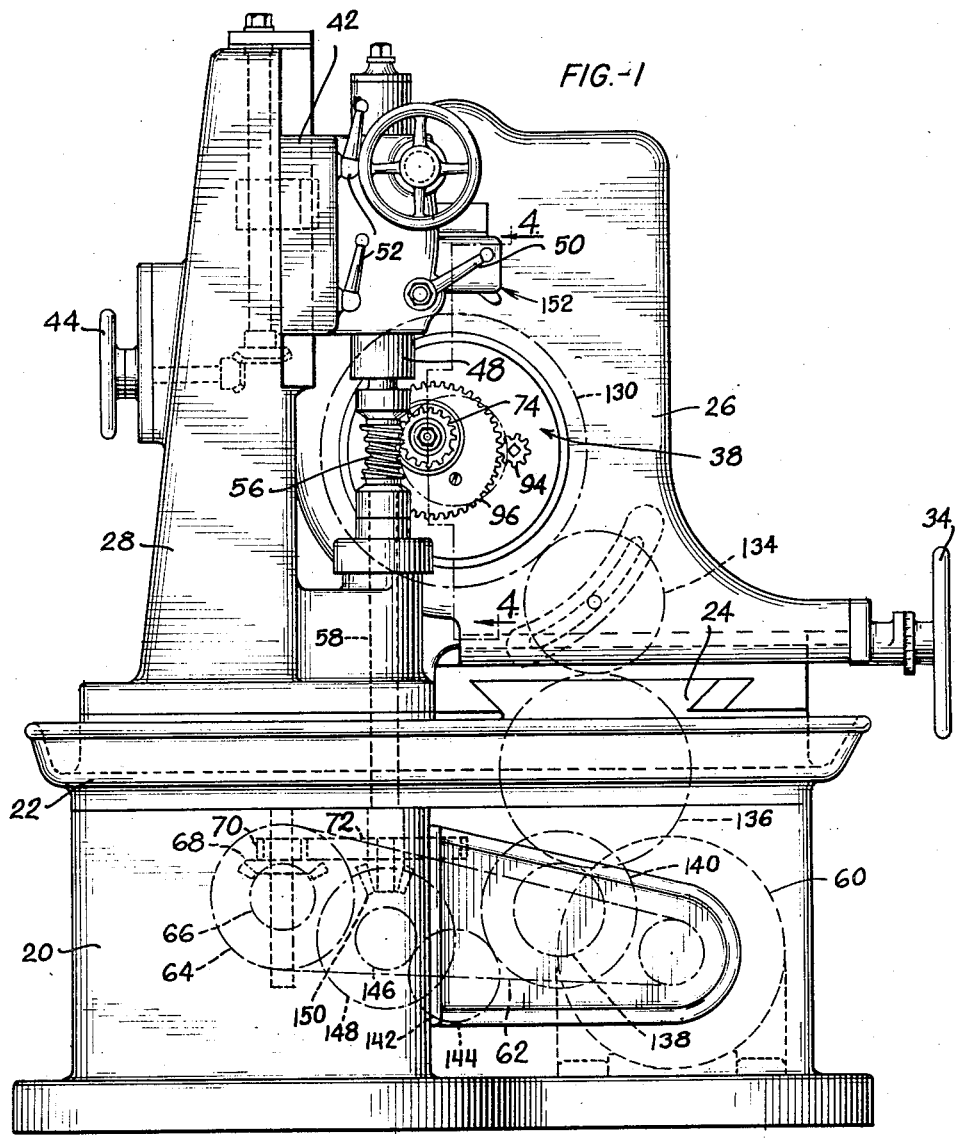

The upright frame 28 is provided with a vertical guide 40, which slidably receives and guides a vertical slide 42. Vertical movement of the slide 42 is occasioned by manual manipulation of a hand wheel 44, as indicated in Figure 1. The slide 42 is formed integral with a bearing section 46, which supports a quill 48. This quill is adapted to be secured against longitudinal displacement within the bearing 46 by means of a clamping member 50, and the slide 42 is designed to be secured against vertical displacement along the guide 40 by means of clamping members 52.

The quill 48 provides the upper bearing for an arbor 54 designed to carrying a worm blank 56. A shaft 58, Figures 1 and 9, forming an extension of the worm supporting arbor, is driven from a prime mover or electric motor 60 through a flexible element or belt 62, a pulley 64, a pair of bevel gears 66—68, a pinion 70, and a larger gear 72, which is mounted upon the shaft 58. During the rotation of the worm blank 56 through the agency of the mechanism just described, a thread is adapted to be cut in the blank by means of a gearlike cutting tool 74, which is driven by means of the spindle mechanism 38 previously referred to.

This spindle mechanism 38 serves not only to rotate the cutter 74 about its own axis, but also to cause the cutter to move in an orbit whose center is spaced from the center of the cutter. Before describing in detail the mechanism which causes the cutter 74 to move in positive timed relation with the rotation and lead of the worm to be cut, I propose to describe the theory of operation of the cutter, as clearly illustrated in Figures 10 to 13, inclusive. It will be seen that the cutter 74 has a pitch circle 76 and a center, which I have designated generally by the letter A. The center or axis A of the cutter 74 is eccentrically disposed with respect to a center or axis B. The pitch line of the worm 56 to be cut is designated by the circle 78, and the axis B constitutes the center of the circle coincident with this pitch line 78. Thus it will be apparent that the pitch diameter of the gearlike cutter 74 is less than the diameter of the pitch line 78. Heretofore, in some instances it has been the practice, in producing hour-glass worms, to employ a cutter whose pitch circle is coincident with the pitch line of the worm to be cut. In other words, in conventional methods with which I am familiar, it has been the practice to employ a gear cutter, the pitch circle of which is coincident with the pitch line as the curvilinear line 78 shown in Figures 10 to 12, inclusive. My invention, on the other hand, contemplates the use of a cutter whose pitch diameter is less than the pitch diameter of the circle coincident with the pitch line of the worm to be cut, and which moves relative to the rotating worm blank so as to form the worm thread in accordance with the molding generating principle. To accomplish this, I propose to simultaneously subject the cutter 74 to two movements, one, the movement or rotation of the cutter about its own axis A, and the other, the movement of the cutter about the axis B so as to move the axis A along an orbit indicated by the line 80, Figures 10 to 12, inclusive.

Referring to Figure 10, it will be seen that I have disclosed the cutter 74 in the position it occupies just prior to the engagement thereof with the worm blank 56. Assume that the blank is rotating as indicated by the directional arrow in Figure 10, and the cutter 74 is rotating about its own axis A in the direction indicated by the directional arrow A', and that said cutter is also moving along the orbit 80 about the axis B in the direction indicated by the arrow B'. By properly coordinating these movements by means of the spindle mechanism 38 about to be described, the teeth 74a in the cutter 74 move into operative association with the worm blank 56 in such a manner that the pitch circle 76 of the cutter, in effect, rolls along the pitch line 78 of the worm 56. This movement corresponds with the molding generating principle. In Figure 12 I have shown the position occupied by the cutter just after it has completed its cutting operation.

In Figure 13 I have shown a diagrammatic representation of the cutting action of the teeth 74a. The path followed by the teeth 74a as they move from the dot-and-dash position to the solid line position shown in Figure 13, is indicated by the series of dotted lines positioned between the worm blank and the teeth of the solid line cutter. This method of forming the thread or threads in the worm blank must be clearly distinguished from the conventional forming tool method or any other methods which do not follow the molding generating principle.

Having described the theory upon which the cutting action takes place, I shall describe more in detail the spindle mechanism 38 which serves to impart movement to the cutter 74. The cutter 74 is mounted upon the free extremity of a spindle 82, Figures 4 and 9, and this spindle, in turn, is rotatably carried by a spindle sleeve 84. Anti-friction bearings 86 and a plain bearing 88 provide the support for the spindle 82 within the sleeve 84. The sleeve 84 is, in turn, eccentrically mounted within a second sleeve 90. It will be seen that the axis of the spindle 82 is the axis A previously referred to in connection with the disclosure in Figures 10 to 12, inclusive, and that the axis of the sleeve 90 is indicated by the line B (Figure 10) previously referred to. The spindle 82 is eccentrically positioned within the sleeve 84 so that by effecting relative rotation between the sleeve 84 and the sleeve 90, the degree of eccentricity of the axis A with respect to the axis B may be varied. This adjustment may be made by first loosening a set screw 92, Figure 4, and then imparting rotation to the pinion 94, which meshes with gear teeth 96 provided along the outer periphery of the sleeve 84. Rotation may be imparted to the pinion 94 by engaging a squared end portion 94a. By tightening the screw 92, a locking member 98 is tightened against the sleeve 90, thereby operatively connecting the sleeves 84 and 90. The spindle 90 is rotatably mounted within a frame 100, which forms a part of the spindle head 26 previously referred to. Rotation is imparted to the sleeve 90 from a driving gear 102, which meshes with a gear 104 secured to the sleeve 90 by means of a clamping ring 106, Figure 4. The speed of rotation of the gear 102 is controlled by means of a clutch mechanism 108, which includes a clutch member 110 disposed between a pair of clutch elements 112 and 114, Figure 9. The clutch element 110 is slidable upon and rotatable with a drive shaft 111. When the clutch element 110 engages the clutch member 112, the gear 102 will be driven directly from the shaft 111, due to the fact that the clutch element 112 is operatively connected with the gear 116, and the gear 116 is operatively connected with the gear 102. The gear 116 meshes with a smaller gear 118, which is driven from a gear 120 meshing with a gear 122. The gear 122 is connected with the clutch member 114 and is loosely mounted upon the drive shaft 111. When the clutch member 110, Figure 9, is shifted to the right into engagement with the clutch member 114, the gear 102, and consequently the gear 104 meshing therewith, is driven at a reduced speed through the gear train 116, 118, 120, and 122. Rotation is imparted to the drive shaft 111 through a gear train 124, 126, 128, 130, 134, 136, 138, 140, 142, 144, 146, 148, and 150. The gear 150 is connected with the lower end of the shaft 58. The foregoing gear train is clearly shown in Figure 9, and portions thereof in Figures 1 and 4.

From the description thus far given, it will be apparent that the rotation of the gear 104, which is mounted upon the sleeve 90, causes the axis A of the cutter to move along the orbit 80 shown in Figures 10 to 12, inclusive. I propose to time the functioning of the clutch mechanism 108 through the agency of an electrical device 152, which includes a solenoid 154 connected with a clutch shifting lever 156, so that the movement of the cutter 74 along its orbit will take place at a slow or feeding rate during that portion of the cycle when the cutter actually engages the worm blank 56. The faster movement of the cutter along the orbit 80 takes place during the idle portion of the cycle, thereby reducing to a minimum the time required to successively bring the cutter into operative engagement with the work subsequent to the completion of a cutting stroke.

Figure 4:
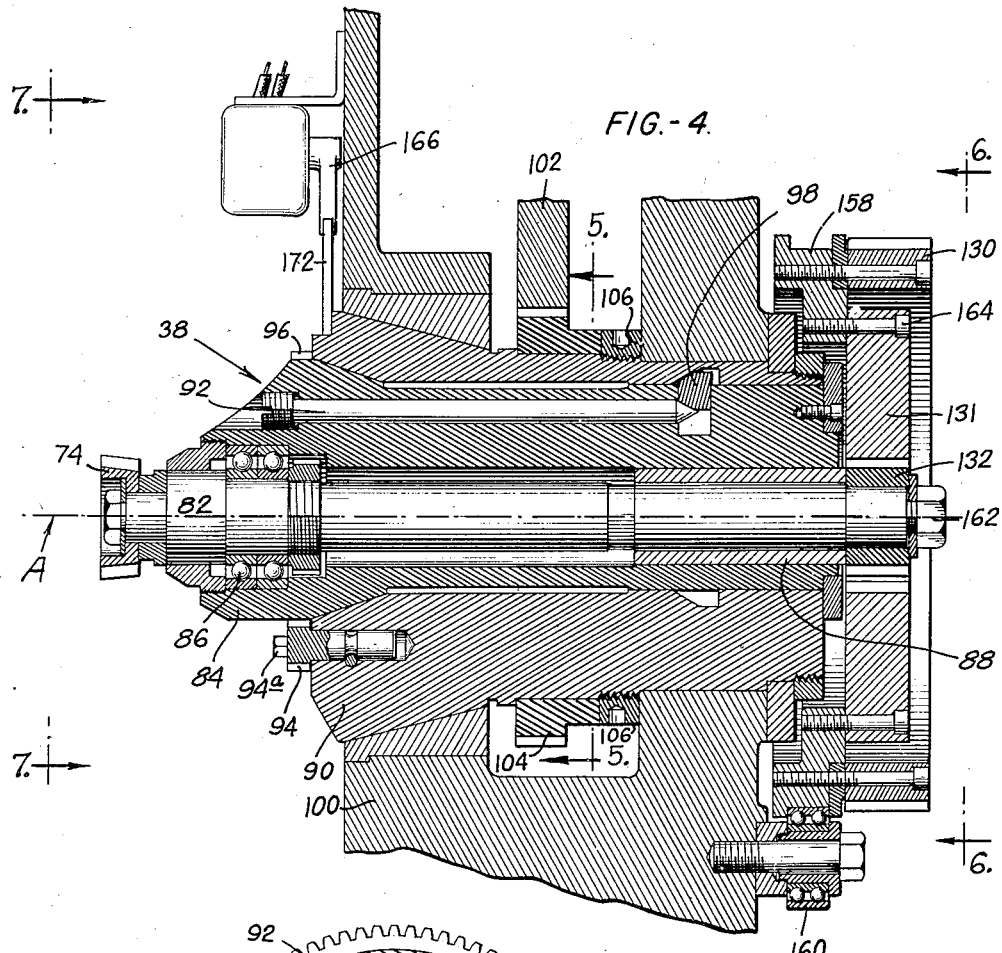
Figure 4 is an enlarged fragmentary vertical sectional view of the cutter supporting spindle and associated driving elements, said view being a central vertical section thereof, taken substantially along the line 4—4 of Figure 1.
Figure 5:
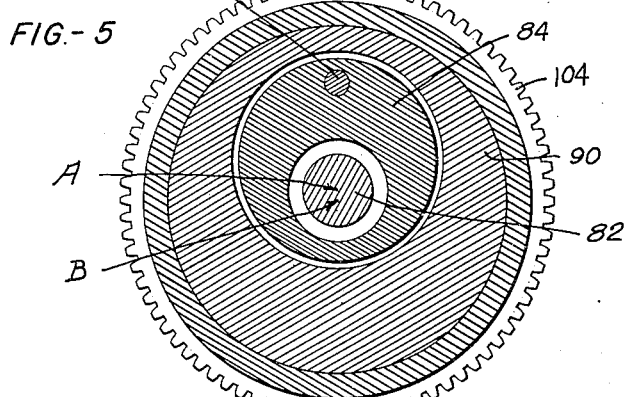
Figure 5 is a fragmentary transverse sectional view of the cutter driving spindle taken substantially along the line 5—5 of Figure 4.

Rotation of the cutter 74 about its own axis A is accomplished through the agency of the gear or pinion 132, which engages the internal teeth 130a of the gear 131. The external teeth of the gear 130 are driven from the gear 134, Figure 9. The gears 130 and 131 are shown diagrammatically in Figure 9 as a single element. However, the actual construction thereof is shown in Figure 4 and comprises a plurality of elements. It will be seen that the gears 130 and 131 are secured to a common drum 158, which is rotatably supported by four anti-friction rollers 160 (see particularly Figures 4 and 6). These rollers 160 are mounted upon the frame 100. The gears 131 and 132 are readily removable by loosening the nut 162 and the pins 164, whereby to accommodate the particular size of worm to be produced. In other words, the pinion 132 conforms structurally with the cutter 74 and rolls along a pitch circle corresponding with the pitch line 78 indicated in Figures 10 to 12, inclusive. This pitch circle conforms with the pitch circle of the internal gear 131. The automatic changing of speeds through the manipulation of the clutch mechanism 110 is controlled by a pivoted bell-crank 166 having a pair of arms 168 and 170. A finger 172 rotatable with the sleeve 190 is adapted to successively engage the fingers of the bell-crank and thereby effect the shifting of a contact member or switch 174 shown diagrammatically in Figure 8. When the finger 172 elevates the bell-crank arm 170, the switch element 174 is shifted so as to condition the circuit to energize the solenoid 152 for urging the arm 156 in a direction to cause the engagement of the clutch member 110 with the clutch member 112, thereby causing the cutter 74 to travel at a fast rate from the position shown in Figure 12 to the position shown in Figure 10. As the bell-crank arm 168 is subsequently elevated by the finger 172, the switch 174 is shifted to condition the circuit of Figure 8 so as to effect the shifting of the clutch member 110 into engagement with the clutch member 114, thereby causing the cutter 74 to travel at a slower or feeding rate along its orbit. Obviously the invention is in no sense limited to this particular type of electrical control, nor to other specific structural features disclosed herein, but is capable of other numerous modifications and changes without departing from the spirit and scope thereof.

From the foregoing, it will be apparent that the invention contemplates a simple and improved machine whereby novel methods of producing hour-glass worms may be practiced. The position of the cutter with respect to the blank may be conveniently adjusted by manual manipulation of the hand wheels 30 and 34. Any number of cuts may be made by the cutter, and, if desired, a roughing cut may first be made and then followed by a finishing cut. Furthermore, in some instances it may be desirable to employ a roughing cutter, and upon the completion of the roughing operation, a finishing cutter mounted in its place. The ease with which adjustments may be made also presents a very desirable feature. The use of a cutter having a pitch circle which is smaller in diameter than the pitch circle coincident with the pitch line of the worm to be cut, coupled with the fact that this small cutter operates in accordance with the molding generating principle in forming the worm thread, presents a very practical construction because it precludes the necessity of requiring a special gear cutter for each size of worm to be cut. By merely adjusting the eccentricity of the cutter axis with respect to the spindle axis, said cutter may be used for producing worm threads, which vary over a rather wide range of sizes.

My invention enables the use of relatively small diameter cutters for cutting tooth sections in relatively large blanks. Conventional methods, as mentioned above, necessitate the use of relatively large cutters for relatively large blanks for the reason that the cutter must correspond in diameter with the diameter of a circle coincident with the curved or arcuate pitch line of the thread sections to be cut. Thus, my invention provides methods and apparatus whereby relatively small cutters may be efficiently employed to produce thread or tooth sections in a blank in accordance with the molding generating principle, thereby presenting a very economical and practical system of shop procedure.

It will be apparent from the foregoing description that the invention contemplates the use of a pair of master gears, namely, the internal gear 131 which meshes with the gear or pinion 132. When it is desired to replace the cutter 74 with a cutter of different size, the gears 131 and 132 are also replaced by gears which correspond in size to the new cutter. In other words, the pitch circle of the cutter corresponds with the pitch circle of the pinion or gear 132, and the pitch circle of the gear 132 is of the same diameter as a circle coincident with the curved pitch line of the gear member or worm which is to be produced.

Having thus described my invention, what I claim as new and desire to secure by Letters Patent is:

Apparatus for producing a gear member provided with a tooth section having an arcuate pitch line including a frame, a rotary spindle carried by the frame for supporting a blank, a cutter driving mechanism including a spindle adapted to support a gear tooth cutter in the vicinity of a supported blank, a rotary sleeve for carrying said cutter supporting spindle, the axis of the sleeve being normally eccentric with respect to the axis of the cutter supporting spindle, a bearing for said sleeve, a pinion carried by the cutter supporting spindle, an internal gear meshing with said pinion, driving means connected with said sleeve for imparting rotation thereto, driving means connected with the internal gear for imparting rotation thereto, the pitch diameter of the pinion corresponding with the pitch diameter of the gear tooth cutter and the pitch circle of the internal gear corresponding in diameter with the diameter of a circle coincident with the arcuate pitch line of the gear member to be cut, and driving means for rotating the blank whereby the cutter is adapted to cut a tooth section in a supported blank in accordance with the molding generating principle.

JOSEPH R. RICHER.